(12) United States Patent
Towata et al.

(10) Patent No.: US 7,026,058 B2
(45) Date of Patent: Apr. 11, 2006

(54) MULTILAYERED HYDROGEN ABSORBING BODY

(75) Inventors: Shin-ichi Towata, Nagoya (JP); Masakazu Aoki, Aichi-gun (JP); Tatsumi Hioki, Nagoya (JP); Akio Itoh, Nagoya (JP); Akihiko Koiwai, Seto (JP); Toshihiro Mouri, Okazaki (JP); Katsushi Saito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 251 days.

(21) Appl. No.: 10/623,731

(22) Filed: Jul. 22, 2003

(65) Prior Publication Data

US 2004/0110023 A1 Jun. 10, 2004

(30) Foreign Application Priority Data

Aug. 7, 2002 (JP) ............................. 2002-229674

(51) Int. Cl.
- B32B 15/00 (2006.01)
- B32B 15/01 (2006.01)
- B32B 33/00 (2006.01)
- C01B 3/00 (2006.01)
- C23C 30/00 (2006.01)

(52) U.S. Cl. .................. 428/615; 428/649; 428/662; 428/670

(58) Field of Classification Search ............... 428/615, 428/649, 662, 670
See application file for complete search history.

(56) References Cited

U.S. PATENT DOCUMENTS

| | | | |
|---|---|---|---|
| 5,906,792 A | 5/1999 | Schulz et al. | |
| 6,214,492 B1 * | 4/2001 | Kono et al. | 429/218.2 |
| 6,329,076 B1 * | 12/2001 | Kawabe et al. | 428/656 |
| 6,337,146 B1 * | 1/2002 | Sogabe et al. | 428/649 |
| 6,793,799 B1 * | 9/2004 | Ozawa et al. | 205/559 |

FOREIGN PATENT DOCUMENTS

| | | |
|---|---|---|
| DE | 697 04 547 T2 | 1/1996 |
| EP | 1 114 874 A1 | 7/2001 |
| EP | 1 116 797 A1 | 7/2001 |
| EP | 0 826 249 B1 | 4/2002 |
| JP | A 9-59001 | 3/1997 |
| JP | A 2002-105576 | 4/2002 |
| WO | WO 00/077266 A1 | 12/2000 |
| WO | WO 01/006024 A1 | 1/2001 |

OTHER PUBLICATIONS

JP 2002-105576 English Machine Translation, Fujii et al., Hydrogen Occluding Laminated Structure, Apr. 2002.*

\* cited by examiner

Primary Examiner—Deborah Jones
Assistant Examiner—Jason Savage
(74) Attorney, Agent, or Firm—Oliff & Berridge, PLC

(57) ABSTRACT

A multilayered hydrogen absorbing body is provided which is formed by laminating at least two types of hydrogen absorbing materials. The degrees of strains cause due to absorption/desorption of hydrogen are different between the hydrogen absorbing materials adjacent to each other.

9 Claims, 2 Drawing Sheets

| SAMPLE NO. | STRUCTURE OF MALTILAYERED HYDROGEN ABSORBING BODY AND THICKNESS OF EACH LAYER (nm) | HYDROGEN DESORPTION AMOUNT (% BY MASS) |
|---|---|---|
| # 1 | Pd(20)/86at%Mg-9.5at%Ni-4.5at%Nd(50)/Pd(20) | 5.1 |
| # 2 | Pd(20)/86at%Mg-9.5at%Ni-4.5at%Nd(100)/Pd(20) | 5.0 |
| # 3 | Pd(20)/86at%Mg-9.5at%Ni-4.5at%Nd(200)/Pd(20) | 4.9 |
| # 4 | Pd(20)/86at%Mg-9.5at%Ni-4.5at%Nd(100)/Pd(20) /86at%Mg-9.5at%Ni-4.5at%Nd(100)/Pd(20)/86at%Mg -9.5at%Ni-4.5at%Nd(100)/Pd(20) | 5.1 |
| # 5 | 86at%Mg-9.5at%Ni-4.5at%Nd(100)/Pd(20) | 5.2 |
| # 6 | Pd(20)/90at%Mg-10at%Ni(50)/Pd(20) | 6.0 |
| # 7 | 8at%Ca-17at%Mg-75at%Ni₉ (50)/86at%Mg-9.5at%Ni -4.5at%Nd(100)/8at%Ca-17at%Mg-75at%Ni₉ (50) | 3.4 |
| # 8 | 8at%Ca-17at%Mg-75at%Ni₉ (50)/86at%Mg-9.5at%Ni -4.5at%Nd(100)/90at%Mg-10at%Ni(50) | 4.2 |
| # 9 | 86at%Mg-9.5at%Ni-4.5at%Nd(100)/83at%Mg-17at%Y(50) | 5.5 |
| # 10 | 85at%Mg-10at%Ni-5at%Ce(100)/86at%Mg-9.5at%Ni -4.5at%Nd(100)/85at%Mg-10at%Ni-5at%Ce(100) | 5.4 |
| # 11 | Pd(20)/99at%Mg-1at%Ti(50)/Pd(20) | 0.0 |
| # 12 | Pd(20)/99at%Mg-1at%V(50)/Pd(20) | 0.1 |
| # 13 | Pd(20)/99.9at%Mg(50)/Pd(20) | 0.1 |
| # 14 | Pd(20)/40at%Ti-35at%V-25at%Cr(50)/Pd(20) | 3.2 |
| REFERENTIAL EXAMPLE | 40at%Ti-35at%V-25at%Cr (INGOT) | 2.2 |

TABLE 2

FIG. 1

TABLE 1

| HYDROGEN ABSORBING MATERIAL | YIELD STRESS (MPa) | HYDROGEN ABSORPTION AMOUNT (% BY MASS) |
|---|---|---|
| Pd | 51 | 0.5 |
| 86at%Mg–9.5at%Ni–4.5at%Nd | 260 | 5.6 |
| 90at%Mg–10at%Ni | 150 | 6.1 |
| 8at%Ca–17at%Mg–75at%Ni | 275 | 1.6 |
| 83at%Mg–17at%Y | 245 | 5.0 |
| 85at%Mg–10at%Ni–5at%Ce | 240 | 5.6 |
| 99.9at%Mg | 40 | 7.4 |
| 99at%Mg–1at%Ti | 42 | 7.0 |
| 99at%Mg–1at%V | 41 | 7.0 |
| 40at%Ti–35at%V–25at%Cr | 300 | 3.6 |

FIG. 2

TABLE 2

| SAMPLE NO. | STRUCTURE OF MULTILAYERED HYDROGEN ABSORBING BODY AND THICKNESS OF EACH LAYER (nm) | HYDROGEN DESORPTION AMOUNT (% BY MASS) |
|---|---|---|
| #1 | Pd(20)/86at%Mg-9.5at%Ni-4.5at%Nd(50)/Pd(20) | 5.1 |
| #2 | Pd(20)/86at%Mg-9.5at%Ni-4.5at%Nd(100)/Pd(20) | 5.0 |
| #3 | Pd(20)/86at%Mg-9.5at%Ni-4.5at%Nd(200)/Pd(20) | 4.9 |
| #4 | Pd(20)/86at%Mg-9.5at%Ni-4.5at%Nd(100)/Pd(20) /86at%Mg-9.5at%Ni-4.5at%Nd(100)/Pd(20)/86at%Mg -9.5at%Ni-4.5at%Nd(100)/Pd(20) | 5.1 |
| #5 | 86at%Mg-9.5at%Ni-4.5at%Nd(100)/Pd(20) | 5.2 |
| #6 | Pd(20)/90at%Mg-10at%Ni(50)/Pd(20) | 6.0 |
| #7 | 8at%Ca-17at%Mg-75at%Ni$_9$ (50)/86at%Mg-9.5at%Ni -4.5at%Nd(100)/8at%Ca-17at%Mg-75at%Ni$_9$ (50) | 3.4 |
| #8 | 8at%Ca-17at%Mg-75at%Ni$_9$ (50)/86at%Mg-9.5at%Ni -4.5at%Nd(100)/90at%Mg-10at%Ni(50) | 4.2 |
| #9 | 86at%Mg-9.5at%Ni-4.5at%Nd(100)/83at%Mg-17at%Y(50) | 5.5 |
| #10 | 85at%Mg-10at%Ni-5at%Ce(100)/86at%Mg-9.5at%Ni -4.5at%Nd(100)/85at%Mg-10at%Ni-5at%Ce(100) | 5.4 |
| #11 | Pd(20)/99at%Mg-1at%Ti(50)/Pd(20) | 0.0 |
| #12 | Pd(20)/99at%Mg-1at%V(50)/Pd(20) | 0.1 |
| #13 | Pd(20)/99.9at%Mg(50)/Pd(20) | 0.1 |
| #14 | Pd(20)/40at%Ti-35at%V-25at%Cr(50)/Pd(20) | 3.2 |
| REFERENTIAL EXAMPLE | 40at%Ti-35at%V-25at%Cr (INGOT) | 2.2 |

MULTILAYERED HYDROGEN ABSORBING BODY

BACKGROUND OF THE INVENTION

1. Field of the Invention

The invention relates to a multilayered hydrogen absorbing body formed by laminating a plurality of hydrogen absorbing materials capable of absorbing hydrogen.

2. Description of the Related Art

Recently, hydrogen energy has drawn widespread attention as clean alternative energy, amid growing concerns over environmental problems such as global warming due to emissions of carbon dioxide, and energy problems such as depletion of oil resources. In order to put hydrogen energy into practical use, it is necessary to promote development of technologies for storing and transporting hydrogen in safety. As hydrogen absorbing materials capable of storing hydrogen, carbon materials such as activated carbon, fullerene and nanotube, and a hydrogen absorbing alloy have been developed. Among these materials, the hydrogen absorbing alloy is promising as a novel transportable absorption medium, since the hydrogen absorbing alloy can store explosive hydrogen in a form of metal hydride, which is a safe solid substance, in high volume.

Many different types of hydrogen absorbing alloys are known. Among these alloys, much attention is focused on a magnesium alloy and a vanadium alloy since hydrogen absorption amounts thereof are large. However, the magnesium alloy is not appropriate for a practical use, since the magnesium alloy needs to be at a high temperature of at least 250° C. for absorption/desorption of hydrogen (hereinafter, referred to as "hydrogen absorption/desorption), and a speed at which the magnesium alloy absorbs/desorbs hydrogen (hereinafter, referred to as a "hydrogen absorption/desorption speed") is low, although the hydrogen absorption capability thereof is high. In the case of the vanadium alloy, the hydrogen absorption amount is approximately 4% by mass. However, the vanadium alloy can desorb only approximately half of the absorbed hydrogen at temperatures near the normal temperature, and needs to be at a high temperature of at least 300° C. for desorbing the entire amount of the absorbed hydrogen. Accordingly, various attempts have been made in order to enhance hydrogen absoprtion/desorption characteristics of the magnesium alloy and the like having a large hydrogen absorption amount. For example, Japanese Patent Laid-Open Publication No. 2002-105576 discloses a hydrogen absorbing laminated structure including a hydrogen absorbing layer which is formed by thinning magnesium or a magnesium alloy, and a pair of hydrogen exchanging layers which sandwiches the hydrogen absorbing layer.

The hydrogen absorbing laminated structure disclosed in Japanese Patent Laid-Open Publication No. 2002-105576 is formed by providing the hydrogen exchanging layers on both sides of the hydrogen absorbing layer formed from magnesium or the like. The hydrogen exchanging layers function as catalyst layers in which hydrogen gas is dissociated in an atomic form. According to an embodiment, there is provided a three-layered hydrogen absorbing laminated structure which is formed by sandwiching the magnesium layer between a pair of palladium layers. In the three-layered hydrogen absorbing laminated structure, the hydrogen absorption speed is relatively high. However, the hydrogen desorption speed is not sufficiently high at temperatures near the normal temperature. Namely, even when hydrogen exchanging layers formed from palladium having a catalytic action are provided on both sides of the hydrogen absorbing layer formed from magnesium, hydrogen cannot be sufficiently obtained at temperatures near the normal temperature. Accordingly, the problem described above cannot be solved.

SUMMARY OF THE INVENTION

The invention is made in order to address the problem described above. Accordingly, it is an object of the invention to provide a hydrogen absorbing body which absorbs a large amount of hydrogen, and which absorbs/desorbs hydrogen at a high speed even at temperatures near the normal temperature.

According to one embodiment of the invention, there is provided a multilayered hydrogen absorbing body which is formed by laminating at least two types of hydrogen absorbing materials. The degrees of strains caused due to hydrogen absorption/desorption are different between the hydrogen absorbing materials which contact.

The inventor obtained the following result from a close research on the behavior of the hydrogen absorbing material when hydrogen is absorbed/desorbed. For example, in a hydrogen absorbing alloy, a crystal lattice expands when hydrogen is absorbed, and the crystal lattice shrinks when hydrogen is desorbed. Generally, hydrogen absorption amounts and the hydrogen absorption/desorption speeds vary depending on types of hydrogen absorbing alloys. Accordingly, the degrees of expansion/shrinkage of volumes caused due to hydrogen absorption/desorption vary depending on types of hydrogen absorbing alloys. Consequently, the degrees of strains vary depending on types of hydrogen absorbing alloys. Also, even when the hydrogen absorption amounts are the same among plural types of hydrogen absorbing alloys, values of yield stresses vary depending on types of hydrogen absorbing alloys. Consequently, the degrees of strains, especially the degrees of elastic strains vary depending on types of hydrogen absorbing alloys.

For example, when two different types of hydrogen absorbing alloys are laminated so as to form two layers, each of the hydrogen absorbing alloys expands/shrinks due to hydrogen absorption/desorption. When the layers adjacent to each other contact each other without being detached from each other, the layers act on each other. Since the degrees of strains in the hydrogen absorbing alloys are different from each other, stresses such as a compression stress and a tensile stress are generated between the layers due to the difference in the strain between the two types of hydrogen absorbing alloys. The stresses act as a driving force. Accordingly, when the different types of alloys are laminated, each of the hydrogen absorbing alloys can absorb/desorb hydrogen more easily than when each of the hydrogen absorbing alloys is used alone.

In the above-mentioned multilayered hydrogen absorbing body, different strains are generated in the hydrogen absorbing materials adjacent to each other due to hydrogen absorption/desorption. Accordingly, a stress is generated in each of the hydrogen absorbing alloys, and hydrogen absorption/desorption is promoted. Therefore, when a hydrogen absorbing material having a large hydrogen absorption amount is used, the multilayered hydrogen absorbing body according to the invention absorbs a large amount of hydrogen, and absorbs/desorbs hydrogen at a high speed even at temperatures near the normal temperature.

BRIEF DESCRIPTION OF THE DRAWINGS

The above mentioned and other objects, features, advantages, technical and industrial significance of this invention will be better understood by reading the following detailed description of the exemplary embodiments of the invention, when considered in connection with the accompanying tables, in which:

FIG. 1 is a table showing types of hydrogen absorbing alloys, yield stresses and hydrogen absorption amounts thereof; and FIG. 2 is a table showing hydrogen desorption amounts of various multilayered hydrogen absorption bodies at a temperature of 100° C.

DETAILED DESCRIPTION OF THE EXEMPLARY EMBODIMENTS

In the following description and the accompanying drawings, the invention will be described in more detail in terms of exemplary embodiments.

Hereafter, a multilayered hydrogen absorbing body according to the invention will be described in detail. Note that the multilayered hydrogen absorbing body according to the invention is not limited to the following embodiment. The multilayered hydrogen absorbing body according to the invention may be realized in various other embodiments in which a modification and an improvement that can be made by those skilled in the art are made.

The multilayered hydrogen absorbing body according to the invention is formed by laminating at least two types of hydrogen absorbing materials. The degrees of strains caused due to hydrogen absorption/desorption are different between the hydrogen absorbing materials adjacent to each other.

The term "degree of strain" signifies the degree of expansion/shrinkage of the hydrogen absorbing material when hydrogen is absorbed/desorbed. For example, the strain of the hydrogen absorbing material is obtained by measuring a lattice constant before and after the hydrogen absorbing material absorbs hydrogen by an X-ray diffraction method. The strain is determined based on a change in a lattice constant. Generally, when the types of hydrogen absorbing materials are different from each other, degrees of the strains caused due to hydrogen absorption/desorption are different from each other. Factors used to measure the degree of a strain are, for example, hydrogen absorption amount and a value of yield stress of the hydrogen absorbing material. For example, when the hydrogen absorption amounts are different between the hydrogen absorbing materials, the amounts of hydrogen which can be absorbed are different from each other. Accordingly, the degrees of expansion are different between the hydrogen absorbing materials. In order to increase the difference in the strain between the hydrogen absorbing materials adjacent to each other so as to further promote hydrogen absorption/desorption, it is preferable that the difference in hydrogen absorption amount between the hydrogen absorbing materials be at least 0.5% by mass. It is further preferable that the difference be 1% or more by mass. In this case, the term "hydrogen absorption amount" signifies a maximum amount of hydrogen which can be absorbed on a predetermined condition. The term "predetermined condition" signifies, for example, a condition that the hydrogen absorbing material absorbs hydrogen when being kept for one hour at a of 20° C. and under a hydrogen pressure of 1 MPa.

The value of the yield stress of the hydrogen absorbing material indicates a critical stress at which the hydrogen absorbing material can be elastically deformed, and is used as a factor to measure the degree of strain in the hydrogen absorbing material. The hydrogen absorbing material having a large yield stress can be elastically deformed, even when a large force is applied. Accordingly, a larger elastic strain is likely to be generated. On the other hand, in the hydrogen absorbing material having a small yield stress, an elastic strain is difficult to cause. In order to increase a strain caused due to hydrogen absorption/desorption, and to promote hydrogen absorption/desorption, it is preferable to use a hydrogen absorbing material having a yield stress of at least 50 MPa. It is further preferable to use the hydrogen absorbing material having a yield stress of 60 Mpa or more.

The hydrogen absorbing material used for the multilayered hydrogen absorbing body according the invention is not particularly limited, as long as the material can reversibly absorb/desorb hydrogen. For a practical use, it is preferable to use a material having hydrogen absorption amount of at least 0.1% by mass. Examples of the appropriate materials are metals such as magnesium (Mg), vanadium (V), palladium (Pd), and hydrogen absorbing alloys such as a magnesium alloy, a vanadium alloy, a titanium alloy, a calcium alloy, a zirconium alloy, and a rare earth alloy.

It is preferable that at least one type of hydrogen absorbing materials be a magnesium alloy which has a Mg content of 10 to 90 at % (hereinafter, referred to as "at %"), and which contains at least one element selected from Ni, Nd, Ce, Y and Ca, since the hydrogen absorption amount of the magnesium alloy is large. It is further preferable that the magnesium alloy have a Mg content of 50 at % or more. Examples of the preferable compositions of the magnesium alloy are Mg—Ni, Mg—Ni—Nd, Mg—Ni—Ca, Mg—Ni—Y, Mg—Ni—Ce.

It is preferable that at least one type of the hydrogen absorbing materials be a vanadium alloy which has a V content of 10 to 99 at %. It is further preferable that the vanadium alloy have a V content of 30 at % or more. Examples of the preferable compositions of the vanadium alloy are Ti—V—Cr, Ti—V—Mo, Ti—V—Mn, Ti—Fe—V.

When a hydrogen absorbing alloy is used as a hydrogen absorbing material, at least one type of the hydrogen alloys may be formed of a plurality of phases on a nanometer scale. An example of such a hydrogen absorbing alloy has a so-called multiphase structure which has a phase of an intermetallic compound formed of the metals forming the hydrogen absorbing alloy, in addition to solidified phases each of which is formed of each of the metals forming the hydrogen absorbing alloy. The hydrogen absorbing alloy having an amorphous phase may be used. In the hydrogen absorbing alloy formed of a plurality of phases, the hydrogen absorption/desorption speeds vary among phases. Accordingly, the degrees of expansion/shrinkage caused due to hydrogen absorption/desorption vary among phases. Therefore, a difference in strain is generated even inside the hydrogen absorbing alloy forming one layer of the multilayered hydrogen absorbing body. Thus, a stress is generated due to the difference in strain among phases, and movement of hydrogen is promoted by the stress. Namely, even inside the layer formed of one type of hydrogen absorbing material, hydrogen absorption/desorption is promoted. Accordingly, it is possible to enhance the hydrogen absorption/desorption speed by using the hydrogen absorbing alloy formed of a plurality of phases on a nanometer scale as at least one type of the hydrogen absorbing materials. In this case, the term "nanometer scale" signifies a range of 1 nm to 999 nm.

The multilayered hydrogen absorbing body according to the invention is formed by laminating at least two types of above-mentioned hydrogen absorbing materials. A method for laminating the hydrogen absorbing materials is not particularly limited, as long as the degrees of strains are different between the hydrogen absorbing materials adjacent to each other. For example, a two-layered hydrogen absorbing body may be formed by laminating two types of hydrogen absorbing alloys each of which forms one layer. Also, three-layered hydrogen absorbing body may be formed by sandwiching one layer formed of one of the hydrogen absorbing materials between two layers formed of the other hydrogen absorbing material. Also, three or more layers may be formed by laminating two or more types of hydrogen absorbing materials. The multilayered hydrogen absorbing body according to the invention needs to be manufactured by known thin film forming methods such as a spatter method and flash evaporation method.

The thickness of the hydrogen absorbing material is not particularly limited, as long as the hydrogen absorption/desorption caused due to a strain can be promoted in each of the materials. For example, the thickness of a layer needs to be at least 10 nm, according to a time necessary for forming a layer. It is further preferable that the thickness be 20 nm or more. Also, it is preferable that the thickness be at most 1000 nm in order to further promote hydrogen absorption/desorption due to a difference in strain. It is further preferable that the thickness be 500 nm or less.

EXAMPLE

The multilayered hydrogen absorbing bodies according to the embodiment of the invention were manufactured using various types of hydrogen absorbing materials. Then, the manufactured multilayered hydrogen absorbing bodies were made to absorb hydrogen, and were then made to desorb the absorbed hydrogen. Subsequently, the amounts of desorbed hydrogen were measured. Hereafter, the manufactured multilayered hydrogen absorbing bodies and the hydrogen desorption amounts threreof will be described.

(1) Manufacture of Multilayered Hydrogen Absorbing Bodies

Various types of multilayered hydrogen absorption bodies each of which had two, three or seven layers were manufactured using the hydrogen absorbing materials shown in Table 1. Table 1 shows the hydrogen absorbing materials, and the yield stresses and hydrogen absorption amounts thereof.

As an example of a manufacturing method for the multilayered hydrogen absorbing body, a method will be described in which palladium and a magnesium alloy (86 at % Mg-9.5 at % Ni-4.5 at % Nd) are used as hydrogen absorbing materials, and a multilayered hydrogen absorbing body having three layers is manufactured. The other multilayered hydrogen absorption bodies were manufactured by the same method, except that the types of the hydrogen absorbing materials were different from those in the above-mentioned example.

Initially, a Pd layer was formed to have a thickness of 20 nm on one surface of a silica glass plate (20 mm×20 mm) having a thickness of 0.3 mm, which was a base material. Next, a layer (86 at % Mg-9.5 at % Ni-4.5 at Nd) was formed to have a thickness of 50 nm on the surface of the Pd layer. Another Pd layer was formed to have a thickness of 20 nm on a surface of the layer (86 at % Mg-9.5 at % Ni-4.5 at Nd). The Pd layer and the layer (86 at % Mg-9.5 at % Ni-4.5 at Nd) were formed by an RF magnetron sputtering method in an argon atmosphere. Thus, a multilayered hydrogen absorbing body, which had three layers formed of Pd/Mg—Ni—Nd/Pd, was formed on the surface of the silica glass. The manufactured multilayered hydrogen absorption bodies were numbered from #1 to #14, as shown in table 2.

(2) Measurement of Hydrogen Desorption Amounts

The various types of manufactured multilayered hydrogen absorption bodies were kept for one hour in a container at a temperature of 20° C. and under a hydrogen pressure of 1 MPa. The multilayered hydrogen absorption bodies were thus made to absorb hydrogen. Each of the multilayered hydrogen absorbing bodies which had absorbed hydrogen was referred to as a "sample A". Meanwhile, on the same condition, the multilayered hydrogen absorbing bodies were made to absorb hydrogen. Then, the multilayered hydrogen absorbing bodies were made to desorb hydrogen by evacuating the hydride container using a rotational vacuum pump for two hours while keeping the container at a temperature at 100° C. Each of the multilayered hydrogen absorption bodies which had desorbed hydrogen was referred to as a "sample B". The sample A and the sample B were taken out from the containers, and the amount of hydrogen contained in each of the multilayered hydrogen absorption bodies was measured. The amount of hydrogen was obtained based on a change in a thermal conductivity of airstream. When the multilayered hydrogen absorbing bodies were heated in an argon airstream, hydrogen was generated and the generated hydrogen changed the thermal conductivity of the airstream. Table 2 shows hydrogen desorption amounts of the multilayered hydrogen absorbing bodies at a temperature of 100° C.

As shown in FIG. 2, the multilayered hydrogen absorption bodies (#1 to #10, #14), which employed hydrogen absorbing materials having yield stresses of at least 50 Mpa, desorbed hydrogen whose amounts ranging from 3.2 to 6.0% by mass. Each of these multilayered hydrogen absorption bodies desorbed a large amount of hydrogen at a temperature of 100° C. The hydrogen desorption amount of the multilayered hydrogen absorbing body (#14) was increased compared with when the hydrogen absorbing material (Ti—V—Cr) forming an intermediate layer was used alone (in a referential example). Namely, the hydrogen desorption amount was drastically increased by laminating the hydrogen absorbing materials such that the degrees of strains varied between the materials adjacent to each other. In the multilayered hydrogen absorption bodies (#11 to #13), the yield stresses of the hydrogen absorbing materials forming the layers were small, and strains were difficult to cause. Therefore, it is supposed that the degrees of the strains in the layers were approximately the same. Accordingly, in the multilayered hydrogen absorption bodies ("11 to #13), desorption of hydrogen was difficult to promote. As a result, the hydrogen desorption amounts thereof were small. Therefore, it has been confirmed that hydrogen can be sufficiently obtained even at temperatures near the normal temperature, by laminating the hydrogen absorbing materials having different degrees of strains caused due to hydrogen absorption/desorption.

The multilayered hydrogen absorbing body according to the invention is formed by laminating at least two types of hydrogen absorbing materials. The degrees of strains caused due to hydrogen absorption/desorption are different between the hydrogen absorbing materials adjacent to each other. By laminating the hydrogen absorbing materials having different degrees of strains, a stress is generated in each of the hydrogen absorbing materials due to hydrogen absorption/desorption. As a result, hydrogen absorption/desorption is promoted. Accordingly, the hydrogen absorbing body is realized from which hydrogen can be sufficiently obtained even at temperatures near the normal temperature.

While the invention has been described with reference to exemplary embodiments thereof, it is to be understood that the invention is not limited to the exemplary embodiments or constructions. To the contrary, the invention is intended to cover various elements of the exemplary embodiments are shown in various combinations and configurations, which are exemplary, other combinations and configurations, including more, less or only a single element, are also within the spirit and scope of the invention.

What is claimed is:

1. A multilayered hydrogen absorbing body, comprising: at least two types of hydrogen absorbing materials which are laminated, wherein degrees of strains caused due to absorption/desorption of hydrogen are different between the hydrogen absorbing materials adjacent to each other, and wherein at least one of the at least two types of the hydrogen absorbing materials is formed of a magnesium alloy which has a Mg content of 50 to 90 at %, and which contains at least one element selected from Ni, Nd, Ce and Y.

2. The multilayered hydrogen absorbing body according to claim 1, wherein a difference in a hydrogen absorption amount between the hydrogen absorbing materials adjacent to each other is at least 0.5% by mass.

3. The multilayered hydrogen absorbing body according to claim 1, wherein the hydrogen absorbing materials have a yield stress of at least 50 MPa.

4. The multilayered hydrogen absorbing body according to claim 1, wherein each of the hydrogen absorbing alloys forms a layer having a thickness of 10 to 1000 nanometers.

5. The multilayered hydrogen absorbing body according to claim 1, wherein at least one of the at least two types of the hydrogen absorbing materials is a hydrogen absorbing alloy formed of a plurality of phases on a nanometer scale.

6. The multilayered hydrogen absorbing body according to claim 5, wherein the hydrogen absorbing alloy forms a layer having a thickness of 10 to 1000 nanometers.

7. The multilayered hydrogen absorbing body according to claim 1, wherein different types of hydrogen absorbing materials are laminated so as to form two layers.

8. The multilayered hydrogen absorbing body according to claim 7, wherein the hydrogen absorbing material forming one of the two layers is palladium, and the hydrogen absorbing material forming the other layer is a magnesium alloy.

9. The multilayered hydrogen absorbing body according to claim 7, wherein the hydrogen absorbing material forming one of the two layers is palladium, and the hydrogen absorbing material forming the other layer is a vanadium alloy.

* * * * *